(12) United States Patent
Muralidharan et al.

(10) Patent No.: US 7,356,545 B2
(45) Date of Patent: Apr. 8, 2008

(54) ENABLING RELATIONAL DATABASES TO INCORPORATE CUSTOMIZED INTRUSION PREVENTION POLICIES

(75) Inventors: Nithya Muralidharan, Foster City, CA (US); Daniel Manhung Wong, Sacramento, CA (US)

(73) Assignee: Oracle International Corporation, Redwood Shores, CA (US)

( * ) Notice: Subject to any disclaimer, the term of this patent is extended or adjusted under 35 U.S.C. 154(b) by 360 days.

(21) Appl. No.: 11/023,112

(22) Filed: Dec. 22, 2004

(65) Prior Publication Data
US 2006/0136493 A1 Jun. 22, 2006

(51) Int. Cl.
G06F 7/00 (2006.01)
G06F 17/00 (2006.01)

(52) U.S. Cl. ............................... 707/103 Y; 707/3
(58) Field of Classification Search ........... 707/103
See application file for complete search history.

(56) References Cited

U.S. PATENT DOCUMENTS 5,862,385 A * 1/1999 Iitsuka ............... 717/156
2001/0021929 A1 * 9/2001 Lin et al. ............... 707/2
2002/0184217 A1 * 12/2002 Bisbee et al. ............... 707/9
2003/0078909 A1 * 4/2003 Pham et al. ............... 707/1

OTHER PUBLICATIONS

Davidson, Mary Ann, et al. "Oracle9iR2 Database Security for E-Business," An Oracle White Paper, Jan. 2002, pp. 1-26.
Browder, Kristy, et al., "The Virtual Private Database in Oracle9iR2," An Oracle Technical White Paper, Jan. 2002.

* cited by examiner

Primary Examiner—John Breene
Assistant Examiner—Alex Gofman
(74) Attorney, Agent, or Firm—Hickman Palermo Truong & Becker LLP (57) ABSTRACT

A method for preventing intrusions in a database system is provided. When the database system receives a request to execute a database command, the database command is parsed to generate parsed information. Before executing the database command, the parsed information is evaluated against a set of rules. If the parsed information satisfies the conditions associated with a rule, the database system performs an action associated with the rule. The action may be an action designed to prevent intrusions, and may be performed instead of or in addition to executing the database command.

42 Claims, 5 Drawing Sheets

ENABLING RELATIONAL DATABASES TO INCORPORATE CUSTOMIZED INTRUSION PREVENTION POLICIES

FIELD OF THE INVENTION

The present invention relates to database security. The invention relates more specifically to intrusion prevention in database systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Intrusion detections systems are software components used to detect anomalous behavior or misuse of resources in a network and its elements. The presently used intrusion detections systems provide various auditing, monitoring, alerting, and reporting features. However, these systems are passive, that is, they only detect anomalous behavior or security breaches but generally do nothing in real-time to prevent such behavior or breaches from occurring.

The presently available intrusion detection systems form an integral part of information security solutions for large enterprises. These systems are generally used at the network/packet level to provide intrusion detection done by outside attackers. However, nowadays most security breaches and resource misuse in large enterprises is done by enterprise personnel that have at least some access to the enterprise computer network for legitimate purposes. The presently available intrusion detections systems are ineffective in, and are generally not suitable for, detecting subtle attacks or anomalous behavior initiated by enterprise personnel from within the enterprise network.

One of the most sensitive areas in an enterprise network includes the enterprise database systems because they store and manage information that is of crucial importance to the enterprise. Enterprise database systems are getting more and more Internet-enabled because Internet connectivity has provided for increased sharing of information, which, in turn, has resulted in higher enterprise productivity. However, getting the database systems more and more Internet-enabled has time and again led to information security breaches because the Internet is the source from which numerous security attacks and exploits have been launched.

For example, one such information security vulnerability that has surfaced recently is a simple buffer overflow in a widely-used database server program. This vulnerability was exploited by the SQL Slammer worm and enabled hackers to gain access to several financial institutions before database administrators could take appropriate corrective measures. This vulnerability also highlighted the fact that lapses in software applications and mid-tiers built on top of database systems render the information stored in a database vulnerable, because, while database systems are designed to deny unauthorized access to information stored in databases, the database systems generally do not provide information security once an attacker has gained legitimate access to the database system by acquiring a valid username/password combination.

Zero day exploits in software systems occur in the span of time between when a vulnerability is detected and when a patch for it is released. Generally, very few security systems provide support for preventing zero day exploits. More specifically, no database system currently provides support for preventing zero day exploits, where the database system, as opposed to a security system or a mid-tier security application that resides outside the database system, provides the support. The support currently provided at the database system level is for detection only, and is passive since all provided measures are undertaken after an attack has occurred. Thus, database systems currently do not provide support for real-time prevention of zero day exploits.

One available non-real-time approach for preventing zero day exploits supported at the database system level is to examine each Structured Query Language (SQL) statement before it enters the database engine in order to determine its validity. For example, after a database vulnerability is announced and until a patch for the vulnerability is released, system administrators have to examine the SQL statements that are targeted towards their databases to ensure that they are not malicious. This approach, however, may not prevent all future attacks, because system administrators may not be familiar with the database structure and may not be able to discern a malicious statement from a legitimate one. Moreover, this approach is practically impossible to implement in high-end database systems that service a heavy SQL statement load and that are required to provide fast response times. Furthermore, this approach may not be able to prevent every possible form of attack, because a SQL statement may be recursive, may access multiple tables, or may seek access to system-wide information, and because the system administrator may not be able to determine whether the SQL statement is malicious just by looking at the statement itself.

Another available non-real-time approach for preventing zero day exploits supported at the database system level involves the generation and inspection of database security logs and audit records. For example, after a database vulnerability is announced and until a patch for it is released, a human security vulnerability expert may have to go through the database system logs and audit records and periodically mine audit trails to ensure that there have been no intrusions. The approach, however, depends entirely on the skill and level of expertise of a human expert. Furthermore, while this approach does provide for intrusion detection, it cannot prevent attacks as they occur.

Based on the foregoing, there is clearly a need for techniques for real-time prevention of security exploits in database systems. Also needed are techniques for intrusion prevention that are effective in detecting and preventing a wide variety of attacks, and that overcome the shortcomings of the approaches described above.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Methods and techniques for intrusion prevention in a database system are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview of and Intrusion Prevention System

Figure 1:
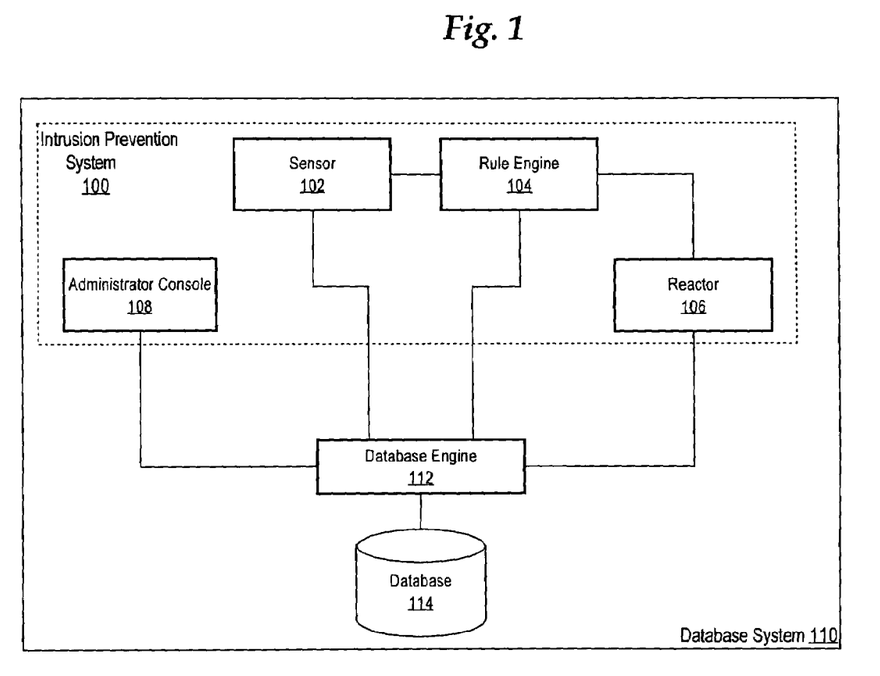
FIG. 1 is a block diagram that illustrates a database system upon which an embodiment of the invention may be implemented.

FIG. 1 is a block diagram that illustrates a database system upon which an embodiment of the invention may be implemented. In the embodiment depicted in FIG. 1, the prevention of intrusions is performed in database system 110 on the basis of information supplied by the included intrusion prevention system 100. In another embodiment, intrusion prevention system is separate from database system 110. In this other embodiment, intrusion prevention system 100 interacts with database system 110 by using a set of Application Programming Interfaces (APIs) that are provided by the database system. This allows an organization using the database system to develop a customized intrusion prevention system that is tailored to the specific organizational setup.

Referring to FIG. 1, database system 110 includes database engine 112, database 114, and intrusion prevention system 100. Database engine 112 is responsible for receiving requests from client applications, processing the requests, retrieving information from database 114, and returning the retrieved information to the client applications that issued the requests. In this embodiment, the requests sent to database engine 112 are requests to execute Structured Query Language (SQL) statements. However, the present invention can be implemented on database or other software systems that receive requests to process statements in any format, including, but not limited to, eXtensible Markup Language (XML), HyperText Markup Language (HTML), and Query-By-Example (QBE). In this embodiment, database 114 is a relational database. However, the present invention can be implemented in a database system that supports a variety of database types, including, but not limited to, hierarchical databases, object-oriented databases, text-file databases, spreadsheet databases, databases in desktop formats, and directories of Operating System (OS) files.

In the embodiment illustrated in FIG. 1, database system 110 includes one database engine and one database. However, the present invention can be implemented on a database system that supports more than one database. Moreover, the database system may support a plurality of databases where each database of the plurality of databases is organized in a different format. For example, a database system on which an embodiment of the invention can be implemented may include a relational database, a legacy hierarchical database, a database that is organized as a directory of operating system files, and a database that is stored in text files. Furthermore, a database system on which an embodiment can be implemented may be a clustered database system where there are several instances of database servers running in separate memory spaces. Each database server instance runs its own database engine, and thus the database system can include more than one database engine.

Intrusion prevention system 100 includes an administrator console 108, a sensor 102, a rule engine 104, and a reactor 106. Intrusion prevention system 100 can be used to enforce a set of rules over the content of all requests directed to database engine 112. In the embodiment illustrated in FIG. 1, administrator console 108 receives information from a user, typically a system administrator, and creates a set of custom rules. Each rule is associated with one or more conditions, and with an action to be undertaken if these conditions are satisfied. An example of such rule, with a condition and an action associated with it, would be "if the length of a SQL statement is larger than 1024 bytes, then don't execute the statement."

The set of rules are accessible by sensor 102, rule engine 104, and reactor 106, and are used to detect and prevent security breaches and intrusions in database system 110. Administrator console 108 is communicatively connected to database engine 112 in order to be able to receive any alerts or audit information that database engine 112 may provide as part of performing intrusion prevention. In the embodiment illustrated in FIG. 1, the components of intrusion prevention system 100 are separate from database engine 112. However, sensor 102, rule engine 104, and reactor 106 may instead be provided as components of database engine 112 and/or as plug-in modules that plug into the database server that includes database engine 102. Such plug-in modules may be associated with one or more Plug-and-Play (PnP) components. When implemented using plug-in modules, the database system 110 communicates to the plug-in modules information, such as the parsed information generated by the database engine 102, used by the plug-in modules to perform their associated functions. Furthermore, sensor 102 and reactor 106 may be provided as software components integrated within rule engine 104.

Sensor 102, rule engine 104, and reactor 106 may be implemented in a variety of ways including, but not limited to, a library of functions, a set of stand-alone modules, an integrated client application, a set of one or more dynamic-link libraries (DLLs), and a set of Application Programming Interfaces (APIs). In execution, sensor 102, rule engine 104, and reactor 106 may take the form of one or more separate processes, one or more threads of the same process, or one or more background processes (e.g. daemons). Further, sensor 102, rule engine 104, and reactor 106 may run on physically separate hardware platforms, but in order to achieve more effective real-time intrusion prevention it is desirable that they run on the same hardware platform as database system 110.

The Sensor

In operation, sensor 102 is communicatively and/or operatively coupled to database engine 112. Sensor 102 receives parsed information from database engine 112. The parsed information received by sensor 102 is generated by database engine 112 in response to a request to execute a SQL statement. Based on the parsed information, sensor 102 may check a variety of parameters, including, but not limited to, the username of the user that issued the request, the database connection over which the request was issued, the database session of which the database connection is a part of, the terminal or host from which the request was issued, and the database objects which the request is trying to access. Sensor 102 can also detect attacks by matching portions of the parsed information to attack pattern strings of known exploits. Sensor 102 then determines whether any further action needs to be taken with respect to the request.

If sensor 102 does not detect any problem with the request, it notifies database engine 112 accordingly, and the database engine can proceed to execute the SQL statement included in the request. If sensor 102 determines that further checks need to be made, it sends the parsed information of the SQL statement to rule engine 104.

The Rule Engine

Rule engine 104 may also be communicatively and/or operatively connected to database engine 112. Rule engine 104 may request more information about the parsed SQL statement from database engine 112 before checking one or more custom rules. Rule engine 104 checks a particular rule by evaluating the conditions associated with the rule. A condition associated with a rule may, for example, relate to a parameter value from the parsed information of the SQL statement. A rule is said to be satisfied or violated, when the condition or conditions associated with the rule are satisfied.

In order to achieve real-time intrusion detection, rule engine 104 operates in a very deterministic way, in one embodiment of the invention. That is, every evaluation of a particular rule performed by the rule engine results in a definite conclusion of whether the parsed information received from database engine 112 satisfies the conditions associated with the particular rule. If rule engine 104 determines that no conditions of any active rule have been satisfied, it then sends a notification to database engine 112 to execute the SQL statement.

If rule engine 104 determines that one or more conditions associated with one or more rules have been satisfied, it notifies reactor 106 about which particular rule or rules have been violated.

The Reactor

Reactor 106 is communicatively and/or operatively coupled to database engine 112. Based on the information received from rule engine 104, reactor 106 determines the action or actions associated with the particular rule or rules whose conditions were satisfied, and notifies database engine 112 what course of action needs to be undertaken in response to the request to execute the SQL statement. Reactor 106 may instruct database engine 112 to undertake a variety of actions including, but not limited to, terminating the SQL statement without executing it, aborting the transaction of which the SQL statement is a part of, terminating the database connection over which the request to execute the SQL statement was transferred, killing the database session of which the database connection is a part of, locking out the user that issued the request to execute the database statement, recording an audit record of the rule violation, and sending an alert to administrator console 108.

Intrusion Prevention Rule Engine with Built-In Rules

According to one embodiment, a rule engine with built-in set of rules that provides real-time intrusion prevention is described. In this embodiment, the rule engine is used to enforce the set of rules on the contents of all SQL statements that are directed to a database system. For example, if a SQL statement will cause a buffer overflow because a large value is to be assigned to a field in a database table, the real-time intrusion prevention rule engine detects the problem by checking a buffer-overflow rule that is included in the set of rules, and can instruct the database system to drop the SQL statement without executing it. The real-time intrusion prevention rule engine accomplishes this by comparing the parsed information of the SQL statement generated by the database system's query parser to the set of rules. In this way, the run-time structures of the database system's query parser are leveraged to detect any exploits that rely on injecting information into legitimate SQL statements. Furthermore, in this embodiment the rule engine can be turned on to prevent zero day exploits, and can be turned off when a patch for the exploits is released and installed.

1. Structural Components of the Rule Engine

A database system receives and processes a sequence of SQL statements or queries. Before each SQL statement is executed, it is parsed by the database system's database engine, and thereafter the parsed information is used by the rule engine to check if the SQL statement violates any rules. Since checking the parsed information of a SQL statement is time-consuming (especially if a large set of rules needs to be checked), it is desirable to integrate the rule engine within the database system. By integrating the rule engine with the database system, the parsed information may be used by both the intrusion prevention rule engine and the execution engine responsible for executing the SQL statement.

Figure 2:
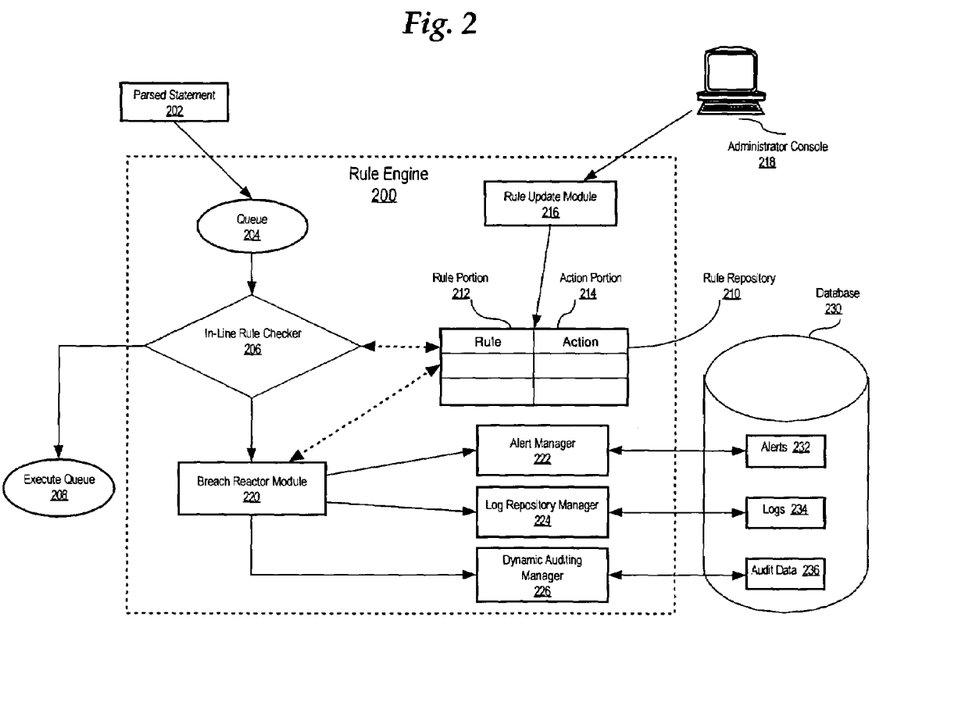
FIG. 2 is a block diagram that illustrates a software component within a database system that can implement an embodiment of the invention.

FIG. 2 is a block diagram that illustrates an intrusion prevention rule engine within a database system that can implement one embodiment of the invention. Rule engine 200 includes queue 204, in-line rule checker 206, rule repository 210, rule update module 216, breach reactor module 220, alert manager 222, log repository manager 224, and dynamic auditing manager 226. In-line rule checker 206 is a sensor responsible for detecting intrusions in the database system, and breach reactor module 220 is a reactor responsible for performing one or more actions in order to prevent the detected intrusions. Rule engine 200 is communicatively coupled to database 230 that stores alerts table 232, logs table 234, and audit data table 236. In this embodiment, rule engine 200 has access to the run-time data structures of the database engine execute queue 208 that holds all statements whose execution has been suspended until rule engine 200 decides on a course of action.

In operation, rule engine 200 receives parsed statement 202 from the database engine query parser. Parsed statement 202 is parsed information generated from a SQL statement that is submitted for execution in a request to the database system. Parsed statement 202 is stored in queue 204 that holds all parsed statements submitted to rule engine 200. In-line rule checker 206 retrieves parsed statement 202 from queue 204 and checks the information in the parsed statement against the set of rules stored in rule repository 210. If in-line rule checker 206 determines that parsed statement 202 does not satisfy any conditions associated with any rule, in-line rule checker 206 passes parsed statement 202 to the database engine for execution.

If in-line rule checker 206 determines that the conditions associated with one or more rules have been satisfied, it places parsed statement 202 in execute queue 208, notifies breach reactor module 220 that further action needs to be taken with respect to parsed statement 202, and fetches for processing the next parsed statement from queue 204.

Breach reactor module 220 then determines which rule or rules in rule repository 210 have been violated by parsed statement 202, and performs the action or actions that are associated with the violated rule or rules. If breach reactor module 220 determines that the action to be performed is to terminate parsed statement 202, breach reactor module 220 notifies the database engine accordingly, and removes parsed statement 202 from execute queue 208. Alternatively, breach reactor module 220 may determine that the action to be performed is to send an alert, to record a log of the detected rule violation, or to turn on dynamic auditing, in which case breach reactor module 220 removes parsed statement 202 from execute queue 208, passes parsed statement 202 to the database engine for execution, and sends the appropriate notification to alert manager 222, log repository manager 224, or dynamic auditing manager 226, respectively.

2. Intrusion Prevention Rules and Actions

Referring to FIG. 2, rule repository 210 includes the rules that encode security breaches and exploits, and the actions that need to be performed in response to detecting a breach or exploit. The information in rule repository 210 is managed and maintained by rule update module 216. Rule update module 216 is communicatively connected to administrator console 218. In operation, a user, typically a system administrator, submits rule-related information via administrator console 218 to rule update module 216. The rule-related information is represented by a rule-action pair, and includes the conditions associated with a particular rule along with the actions that need to be performed if the conditions are satisfied. For example, in order to prevent a zero day exploit, a system administrator may submit a rule-action pair that states "if the length of a SQL statement is larger than 1024 bytes, then kill the session and don't execute the statement." Rule update module 216 receives the rule-related information, and stores the rule and the action in rule repository 210.

Rule repository 210 includes rule portion 212 and action portion 214, which represent the portions of the rule-action pair respectively. In the embodiment illustrated in FIG. 2, rule repository 210 is organized as a table in memory. For example, the rule-action pair given above will be represented by the following two tuples in rule repository 210:

{"if the length of a SQL statement is larger than 1024 bytes", "kill the session"}, and {"if the length of a SQL statement is larger than 1024 bytes", "don't execute the statement"}.

For both tuples, rule portion 212 will include "if the length of a SQL statement is larger than 1024 bytes". For the first tuple, action portion 214 will include "kill the session". For the second tuple action portion 214 will include "don't execute the statement".

The present invention may be implemented by using a rule repository organized in a variety of ways including, but not limited to, a relational table, a hierarchical index, a text file, a directory of files, a spreadsheet, a data tree, a hive, a linked list, and a set of name-value pairs. Furthermore, while it is preferable to store the rule repository in random-access memory for faster access, the present invention can be implemented with the rule repository being stored in any computer readable medium including, but not limited to, electromagnetic disk drives, optical disk drives, network storage space, computer tapes, and read-only memory or disk drives.

2.1 Intrusion Prevention Rules

An intrusion prevention rule is represented by a conditional predicate that evaluates to a Boolean value. The conditional predicate may include one or more conditions with conditional parameters. If more than one condition is included, then the conditions must be co-joined with logical operators, and the aggregation of the conditions must evaluate to a Boolean value. In order to facilitate effective real-time intrusion prevention, it is desirable that every rule created and stored in the rule repository be a deterministic bright-line rule. Except in rules designed to deal with very serious intrusions, it is desirable that the rules be defined in such a way as to give as few false positives as possible during evaluation. When a rule is evaluated at run-time, values of parameters included in the parsed statement replace the conditional parameters in the condition or conditions associated with a particular rule.

For example, a rule may require that a user with username "Tom" not be allowed access to information in database table "Salaries". The conditional predicate representing the rule will be: (<username>="Tom" AND <table_name>="Salaries"), where (<username>="Tom") and (<table_name>="Salaries") are conditions, "<username>" and "<table_name>" are conditional parameters, and "AND" is a logical operator. If this rule is stored in the rule repository and is properly activated, then at run time the in-line rule checker will extract from the parsed information of a SQL statement a username_parameter with the user name of the user executing the SQL statement, and a tablename_parameter with the name of the database table the user is trying to access. The in-line rule checker will then substitute, in the conditional predicate of the rule, "<username>" with the username_parameter and "<table_name>" with the tablename_parameter, and will evaluate the predicate.

For example if user "Jane" tries to access the "Salaries" table, the conditional predicate will look like ("Jane"="Tom" AND "Salaries"=Salaries") and will evaluate to a Boolean "FALSE" (because "Jane" is not equal to "Tom"). In this case, the in-line rule checker will allow the SQL statement to be executed. However, if user "Tom" tries to access the "Salaries" table, the conditional predicate will look like ("Tom"="Tom" AND "Salaries"=Salaries") and will evaluate to a Boolean "TRUE". In this case, the in-line rule checker will suspend the execution of the SQL statement and will notify the breach reactor module, which in turn will determine if any additional action needs to be performed.

Any field included in a parsed SQL statement can be used as a conditional predicate parameter. Furthermore, database system functions and stored procedures that return a scalar value at run-time can be used both as conditional predicate parameters and as conditions. For example, suppose database system function get_date( ) returns the current system date, and "timestamp" is a parameter in the parsed statement indicating when the statement was issued by a user. A conditional predicate then can be formulated as (<timestamp_value>>=get_date( )−1) to detect all requests that are issued against the database system within the last day. Table 1 provides a sample, non-exhaustive list of parameters that can be used as conditional predicate parameters.

TABLE 1

Conditional Predicate Parameters

| Parameter | Description |
| --- | --- |
| username | User name of a database user |
| table_name | Name of a database table |
| user_id | Internal ID of a database user |
| userhost | ID of computer host used by a user to access the database system |

TABLE 1-continued

Conditional Predicate Parameters

| Parameter | Description |
|---|---|
| terminal | ID of terminal from which a user accesses the database system |
| return_code | Return Code of a prior operation performed by a user (usually an in-line function return code) |
| statement_type | Type of SQL statement issued by a user |
| object_schema | ID if the database schema a user is trying to access |
| object_name | The name of a database object a user is trying to access |
| object_id | Internal ID of a database object a user is trying to access |
| timestamp | Datetime (with varying precision) of a request issued by a user |

Any logical operator can be used in a composite conditional predicate to join conditions including, but not limited to, "AND", "OR", "XOR", "MOD", "DIV", "=", ">", "<", ">=", and "<=".

Intrusion prevention rules may also include conditions that take into account historic information in addition to, or instead of, the current parsed information. For example, the condition for a rule may be whether a particular user has accessed a certain table more than a threshold number of times within a particular time interval.

2.2 Intrusion Prevention Actions

An intrusion prevention action is an action that is associated with one or more rules and is performed in response to a determination that the one or more rules have been violated. This determination is made by the breach reactor module based on information included in the rule repository. In the embodiment illustrated in FIG. 2, rule repository 210 includes action portion 214 that contains the actions associated with each rule that is stored in rule portion 212. In this embodiment, each rule-action pair is represented by a two-field tuple in rule repository 210, where the action field holds a value indicating the type of action that is associated with the rule. Breach reactor module 220 includes an action handler that is configured to perform the actions indicated by the values in the action field.

For example, in one embodiment, action field value "1" may indicate that a pager alert is to be sent to a system administrator, action field value "2" may indicate that an e-mail alert is to be sent to a system administrator, and action field value "3" may indicate that the database session that issued the SQL statement is to be terminated. The breach reactor module receives information from the in-line rule checker about which particular rule has been violated by the SQL statement, and retrieves from the rule repository the action field values associated with the particular rule. The breach reactor module then performs the actions indicated by the action field values. In a different embodiment, the breach reactor module does not perform the action, but instead for each particular action it sends the appropriate notification to a module of the database system that is configured to perform the particular action.

Table 2 provides a sample, non-exhaustive list of actions that can be performed in response to a violation of a rule by a SQL statement.

TABLE 2

Intrusion Prevention Actions

| Action # | Action Procedure |
|---|---|
| 1 | Send a Pager Alert |
| 2 | Send an E-mail Alert |
| 3 | Terminate the Database Session |
| 4 | Terminate the Database Connection |
| 5 | Do not execute/Kill the SQL Statement |
| 6 | Turn on Dynamic Auditing |
| 7 | Change Quality of Service (from or to good/moderate/poor) |
| 8 | Execute a user-defined function or stored procedure |
| 9 | Execute a database system function or stored procedure |
| 10 | Lock out the user |
| 11 | Send a dummy value in response to the request |
| 12 | Log an alert |

3. In-Line Rule Checker

Referring to FIG. 2, in-line rule checker 206 is the module that performs rule-based intrusion detection. Queue 204 is used to provide for asynchronous communications between in-line rule checker 206 and the database engine query parser that generates parsed statements from the SQL statements submitted for execution by the database engine. Queue 204 stores the parsed statements passed from the query parser in a queue, and in-line rule checker 206 fetches and processes each parsed statement from queue 204 in turn.

When rule engine 200 is turned on, in-line rule checker 206 checks every SQL statement that is submitted for execution by the database engine. In-line rule checker 206 performs the checks by comparing the parsed statement of a SQL statement with the conditions associated with the set of rules stored in rule repository 210. If in-line rule checker 206 determines that the conditions associated with no rule have been satisfied, then the database engine is notified that the parsed statement can be executed. If in-line rule checker 206 determines that the parsed statement satisfies the conditions associated with one or more rules, then the in-line rule checker places the parsed statement in execute queue 208, and notifies breach reactor module 220 that further action needs to be undertaken with respect to the parsed statement.

Execute queue 208 contains all parsed statements whose execution has been suspended until rule engine 200 makes a decision about whether the parsed statements can be executed, or whether further action needs to be undertaken. In the embodiment illustrated in FIG. 2, execute queue 208 is maintained by the database engine, but rule engine 200 has access to, and can manipulate, the run-time data structures of the queue. For example, the run-time data structure associated with execute queue 208 may include a flag associated with each parsed statement placed in the queue. In-line rule checker 206 may place a parsed statement in execute queue 208 with the flag indicting that the parsed statement is suspended from execution. Later, after determining what action needs to be undertaken with respect to the parsed statement, breach reactor module 220 may change the flag to indicate that the parsed statement is to be executed, or to indicate that the parsed statement is to be terminated without executing it. Alternatively, if breach reactor module 220 determines that the parsed statement is to be terminated without executing it, the breach reactor module may simply remove the parsed statement from execute queue 208.

In the embodiment illustrated in FIG. 2, one in-line rule checker, in-line rule checker 206, is provided within rule engine 200 to service a database system with one database engine. However, in different embodiments, a rule engine can have more than one in-line rule checkers, a rule engine with one in-line rule checker can service more than one database engines, and a rule engine with multiple in-line rule checkers can service multiple database engines.

For example, in one embodiment, the database system is a cluster of a plurality of database server instances. Each database server operates its separate database engine. In this embodiment, there is only one rule engine for all database server instances that operate in the cluster. The rule engine includes a separate in-line rule checker for each database server instance. In this embodiment, the rule engine can run as a separate process in the database system memory space, and each in-line rule checker can run as a separate thread of the rule engine process. In this embodiment, a single rule repository and a single set of rules are used to service the cluster of the database server instances, and a system administrator needs to update the set of rules only once as opposed to updating a set of rules for each database server instance in the cluster.

In a different embodiment, the rule engine is a service that runs in a memory space separate from the memory space of the database system. In this embodiment, the rule engine has one in-line rule checker that has the ability to process parsed statements sent by more than one database engine. In other words, if the rule engine is configured to run as a service, it can provide real-time intrusion prevention for more than one database systems. In this embodiment, the rule engine may include a single-set of rules that are to be applied to parsed statements received from any database system. In yet a different embodiment, the rule engine may include a separate set of rules for each of the database systems it services.

In another embodiment, the rule engine may run as a service and may be configured to include separate in-line rule checkers as separate threads to provide service for more than one database system. In this embodiment, a separate in-line rule checker thread services parsed statements received from the database engine of each database system serviced. In this embodiment, the rule engine may include a single set of rules to be applied to parsed statements received from any database system. In a different embodiment, the rule engine may provide a separate set of rules for each database system serviced.

4. Breach Reactor Module

Referring to FIG. 2, breach reactor module 220 decides the action to be taken when a SQL statement violating one or more rules is submitted for execution. As mentioned above, a wide range of actions may be performed by breach reactor module 220. Breach reactor module 220 determines what action to perform based on the information received from in-line rule checker 206 about which particular rule or rules were violated, and on the information in rule repository 210 that indicates what action is associated with the particular rule or rules that were violated.

Breach reactor module 220 is operatively connected with alert manager 222, log repository manager 224, and dynamic auditing manager 226. In this embodiment, breach reactor module 220 performs the action of logging an alert by sending the appropriate notification to alert manager 222. Alert manager 222 is operatively connected to database 230, and manages a set of alerts in alert table 232. Alert table 232 stores, and alert manager 222 maintains, a variety of alerts including, but not limited to, pager alerts that can be sent to numeric or alpha-numeric pagers, e-mail alerts that can be sent to an e-mail account, and message pop-up alerts that can be sent over operating system messaging protocols to a particular computer host or workstation.

4.1 Creating Log Entries

Breach reactor module 220 performs the action of creating a log record of any rule breaches by communicating the appropriate information to log repository manager 224. Log repository manager 224 is operatively connected to database 230, and is the interface for all components of rule engine 200 that record or retrieve log information. Log repository manager 224 records information in one or more logs, an example of which is logs table 234. Log repository manager 224 may be configured to record a log entry of every type of action performed by any of the components of rule engine 200, including but not limited to, any rule checks performed by in-line rule checker, any additions or modifications or deletions of rules performed by rule update module 216, any notifications or actions performed by breach reactor module 220, any alerts issued by alert manager 222, and any auditing records created by dynamic auditing manager 226.

In the embodiment illustrated in FIG. 2, log repository manager 224 keeps a common log for all log entries created by any of rule engine's 200 components. In a different embodiment, log repository manager 224 keeps a separate log repository for each separate component of rule engine 200. In addition, in different embodiments, log repository manager 224 may maintain and manage logs in a variety of formats including, but not limited to, text format, HTML format, XML format, spreadsheet format, and name-value pairs format.

4.2 Dynamic Auditing

Breach reactor module 220 performs the action of dynamically auditing the session that issued the SQL statement by communicating the appropriate information to dynamic audit manager 226. Dynamic auditing is a feature that allows for monitoring and auditing a database session. The audit record thus generated may include a variety of information, including information about the particular user who issued the SQL statement, regardless of whether or not the particular user has an active connection to the database at the time the audit record is generated. Dynamic auditing is a feature that allows for real-time monitoring, not only of the database connection that issued a problematic SQL statement, but also for all other database connections in the same session. For example, a rule may be created that states "if anyone tries to access confidential data, then start auditing the session." Enforcing this rule effectively marks the entire session as suspect, and monitoring and auditing is extended to the entire session in order to facilitate proactive prevention of any unauthorized access.

Dynamic audit manager 226 is operatively connected to database 230, and may store audit information in audit data table 236. In a different embodiment, dynamic audit manager 226 uses the services of log repository manager 224 to record the audit data generated during monitoring.

In the embodiment depicted in FIG. 2, alert manager 222, log repository manager 224, and dynamic auditing manager 226 are operatively connected to database 230, and use the database's storage space to store information in alert table 232, logs table 234, and audit data table 236. However, the present invention may be practiced in an embodiment in which alert manager 222, log repository manager 224, and dynamic auditing manager 226 store their respective information in operating system files that are not organized and stored in a database structure.

5. Application Programming Interface for Customizing an Intrusion Prevention System An Intrusion Prevention System (IPS) with a rule engine, such as rule engine 200 illustrated in FIG. 2, may be managed by a system administrator via a client application that utilizes an Application Programming Interface (API) for the IPS. The system administrator may also use the client application to create customized intrusion prevention policies and rules. The API for the IPS includes a set of functions that expose the functionality and the features of the IPS. For example, Table 3 lists a non-exhaustive set of functions that may be included in an API according to one embodiment.

TABLE 3

Intrusion Prevention System API Functions

| Function | Function Description and Parameters |
| --- | --- |
| IPS.start ( ) | Starts the IPS |
| IPS.stop ( ) | Stops the IPS |
| IPS.set_rule_engine (parameter1) | Initializes the desired rule engine, where parameter1 controls whether to use the default built-in rule engine, or another custom rule engine |
| IPS.set_rule (parameter1, . . ., parameterN) | Creates a rule, where parameter1, . . ., parameterN are the particular options associated with the rule, including the action associated with the rule |
| IPS.rule_engine_config (parameter1) | Returns all rules in the rule engine identified by parameter1 |
| IPS.remove_rule (parameter1) | Removes a rule, where parameter1 identifies a particular rule |
| IPS.get_rule_state (parameter1, parameter2) | Returns the state of a particular option of a rule, where parameter1 identifies the rule, and parameter2 is an option set by set_rule( ) |
| IPS.add_action_handler (parameter1) | Adds an action handler in the rule engine, where parameter1 identifies a table including the action numbers of the available actions, and the action procedures associated with the action numbers |
| IPS.add_action (parameter1, parameter2) | Adds an action to the action handler of the rule engine, where parameter1 identifies the rule number, and parameter2 identifies the action procedure |

Functional Overview

Figure 3:
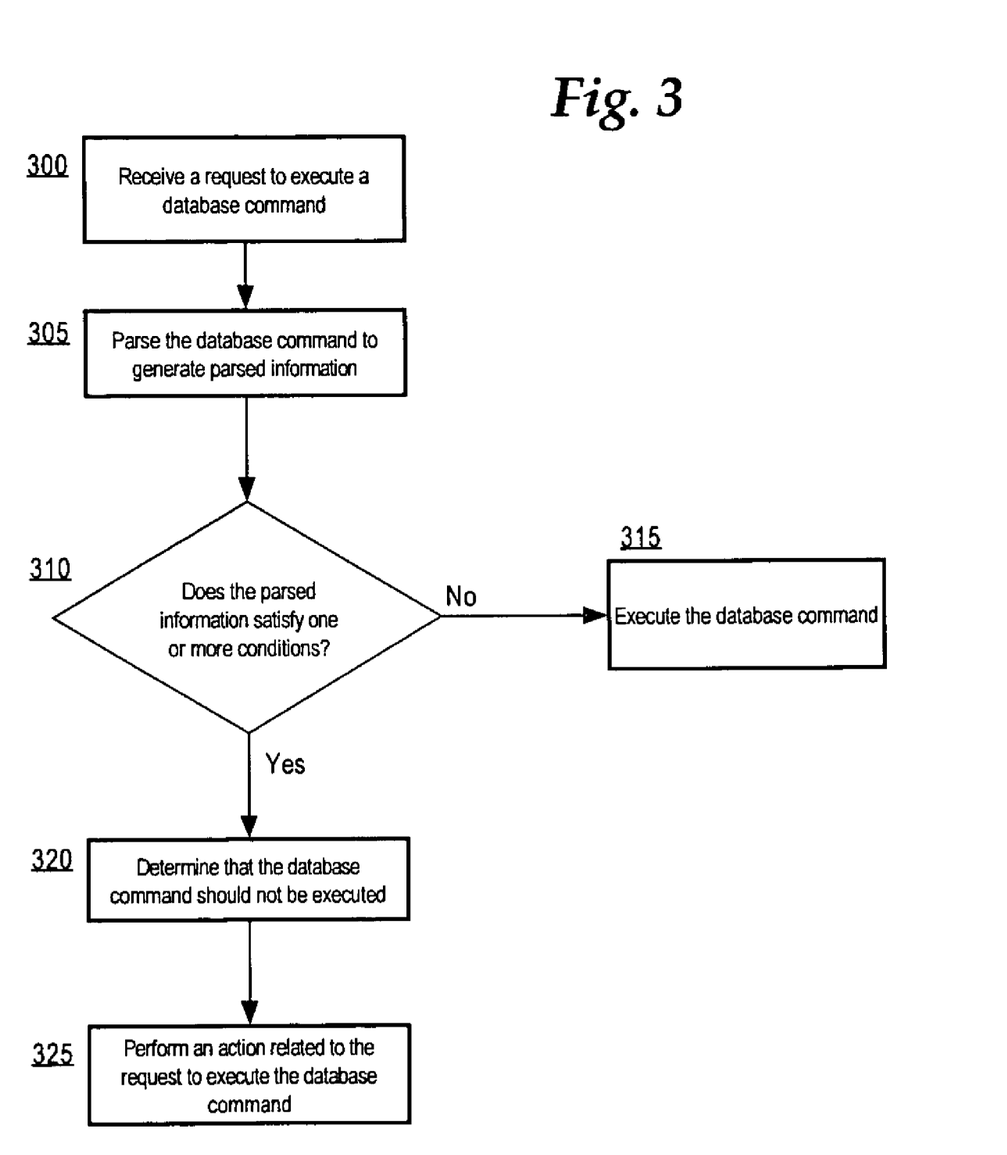
FIG. 3 is a flow diagram that illustrates one technique for intrusion prevention in a database system.

FIG. 3 is a flow diagram that illustrates one technique for intrusion prevention in a database system. In Step 300, a database system receives a request to execute a database command. In Step 305, the database system then parses the database command to generate parsed information. The database command is typically a SQL statement, and the parsing is performed by a database engine with a query parser. In Step 310, prior to executing the database command, a determination is made of whether the parsed information satisfies one or more conditions designed to detect and prevent intrusions in the database system. If the parsed information does not satisfy any conditions, then in Step 315 the database system executes the database command. If the parsed information satisfies one or more conditions, then in Step 320 a determination is made that no database command should be executed in response to the request received in Step 300. In one embodiment, after determining that a database command should not be executed, in Step 325 an action related to the request is performed.

In an embodiment, the step of determining whether the parsed information of the database command satisfies one or more conditions includes making the determination based on one or more default conditions that are specified in the executable code of the database system. In addition, there may be one or more custom-defined conditions that are specified in information provided by a user of the database system.

In one embodiment, the step of determining that no database command should be executed in response to a request received by the database system includes making the determination based on information that is specified by a user of the database system. The user may also specify the condition or conditions used to determine whether the parsed information is appropriate for execution.

Figure 4:
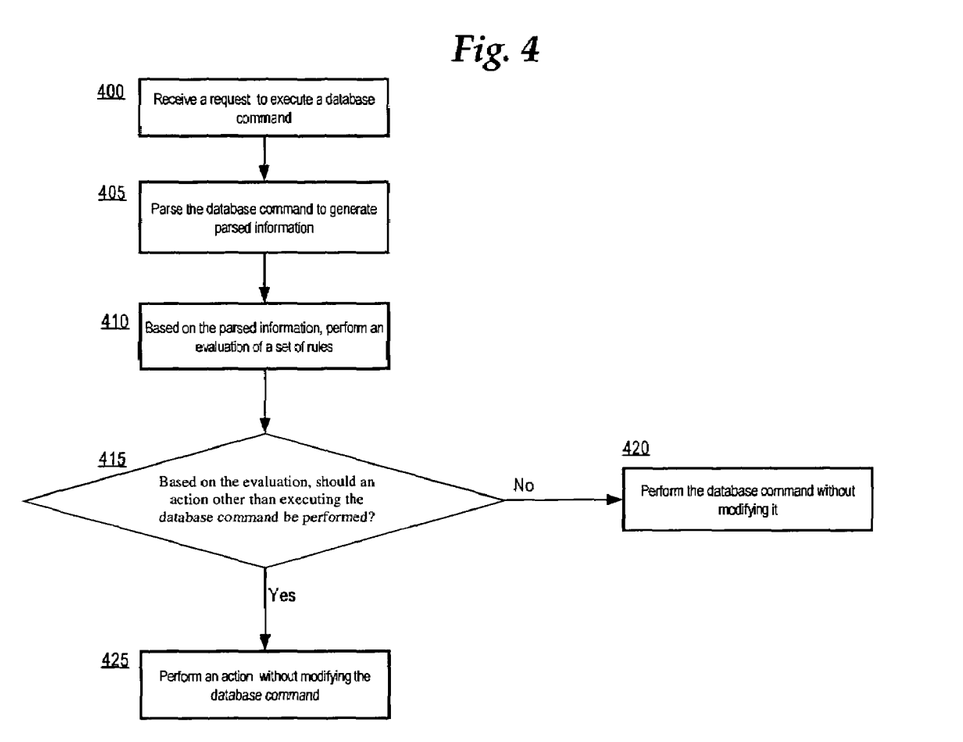
FIG. 4 is a flow diagram that illustrates another technique for intrusion prevention in a database system.

FIG. 4 is a flow diagram that illustrates another technique for intrusion prevention in a database system. In Step 400, the database system receives a request to execute a database command. In Step 405, the database system parses the database command to generate parsed information. Prior to executing the database command, in Step 410 the database system performs an evaluation of a set of rules based on the parsed information. In Step 415, based on the evaluation, the database system determines whether to perform an action other than executing the database command. If, in evaluating the set of rules, the database system determines in that no rules have been violated, then in Step 420 the database system performs the database command without modifying it. If the evaluation of the set of rules indicates that an action other than the database command should be performed, in Step 425 the database system performs the action without modifying the database command.

In one embodiment, if the database system determines that an action other than the database command must be performed, the database system performs the action in addition to executing the database command. In another embodiment, if the database system determines that an action other than executing the database command must be performed, the database system performs the action instead of executing the database command.

In an embodiment, each rule in the set of rules is a conditional predicate that evaluates to a Boolean value. In this embodiment, in performing an evaluation of the set of rules, the database system evaluates the conditional predicates for all rules in the set by using one or more parameter values included in the parsed information. The parameter value may be, for example, a timestamp indicating the datetime when the request to execute the database command was issued. The timestamp parameter value can be of varying precision in that it can indicate the datetime of execution by the year, month, day, hour, minute, second, millisecond, a thousandth of a millisecond, or any combination thereof.

The parameter value may also identify the type of database command that was submitted for execution. The parameter value can identify any database command supported by the database system including, but not limited to, SQL SELECT command, SQL UPDATE command, SQL DELETE command, SQL UNION command, a database system function, a database in-line function, a database system stored procedure, a user-defined function, a user-defined stored procedure, a script of database commands stored outside the database system, and a command to access resources managed by the operating system.

The parameter value that is used to evaluate a conditional predicate of a rule may also identify the object that the database command is trying to access. For example, the parameter value may identify any and all objects stored in the database system including, but not limited to, tables, views, indexes, triggers, database system stored procedures, user-defined stored procedures, database system functions, user-defined functions, alerts, scheduled tasks, and files stored in a database managed by the database system. The parameter value that is used to evaluate a conditional predicate of a rule may also identify a database schema that includes one or more database objects on which the database command is attempting to operate.

In one embodiment, the step of determining, based on the evaluation, whether to perform an action other than executing the requested database command comprises selecting the action to be performed based on information received from a user. In this embodiment, the user specifies what action is to be performed if a particular rule from the set of rules is violated. The actions that can be specified in this manner are any actions that can be performed by the database system, including executing a user-specified operation. The user-specified operation is typically specified by a system administrator, and can be any operation that can be performed by the database system on behalf of a user including, but not limited to, adding or modifying or deleting a record to/from a table, executing a database system stored procedure, executing a user-defined stored procedure, executing database system function, executing a user-defined function, executing a script residing in an operating system file, and sending a customized e-mail to one or more recipients.

In addition, each action that can be performed in response to the evaluation of the set of rules may be associated with a particular rule of the set. The step of performing an evaluation of the set of rules may include determining whether conditions associated with the particular rule have been satisfied. Further, each rule in the set can be associated with more than one action, and an action can be associated with more than one rule.

Additional Actions That Can Be Performed Based on Parsed Information

In one embodiment, the database engine query parser of a database system is leveraged to facilitate the performance of actions that are not necessarily related to intrusion detection or prevention. For example, some or all of the rules in the set of rules may not be related to detecting intrusions in the database system, and the action to be performed may not be related to preventing such intrusions. Instead, the rules may be related to a predefined set of database system conditions and/or database system states, and the action may be related to modifying these conditions and/or states.

For example, based at least in part on the parsed information of the database command, the database system may determine that it needs to perform management of one or more database system resources. In general, performing management of a resource involves changing a property, characteristic, or content of the resource. Examples of performing resource management include increasing or decreasing memory allocated for the purpose of executing the database command, increasing or decreasing processor time slots allocated for the purpose of executing the database command, changing the quality of service (good/moderate/poor) provided to the database connection over which the request to execute the database command was issued, changing the number and types of database object locks granted for the purpose of executing the database command, resolving deadlocks in favor of, or against, the database command, and allocating or de-allocating temporary storage space for the purpose of executing the database command.

In addition, based at least in part on the parsed information, the action that is performed by the database system may include dynamically optimizing the performance of the database system. Dynamically optimizing can be performed by the database system by modifying any database system parameters that can be changed at run-time including, but not limited to, parameters associated with disk storage space, parameters associated with network throughput utilization, parameters associated with processor utilization, and parameters associated with memory usage.

Based at least on the parsed information, the database system may also load-balance the execution of the database command over a plurality of processors. Moreover, based at least in part on the parsed information, the database system may allocate an interval of time, or a time slot, within which the database command is to be executed. In addition, the database system may determine a deadline time by which the database command must complete execution, or else the transaction of which the database command is a part of must be rolled back.

Hardware Overview

Figure 5:
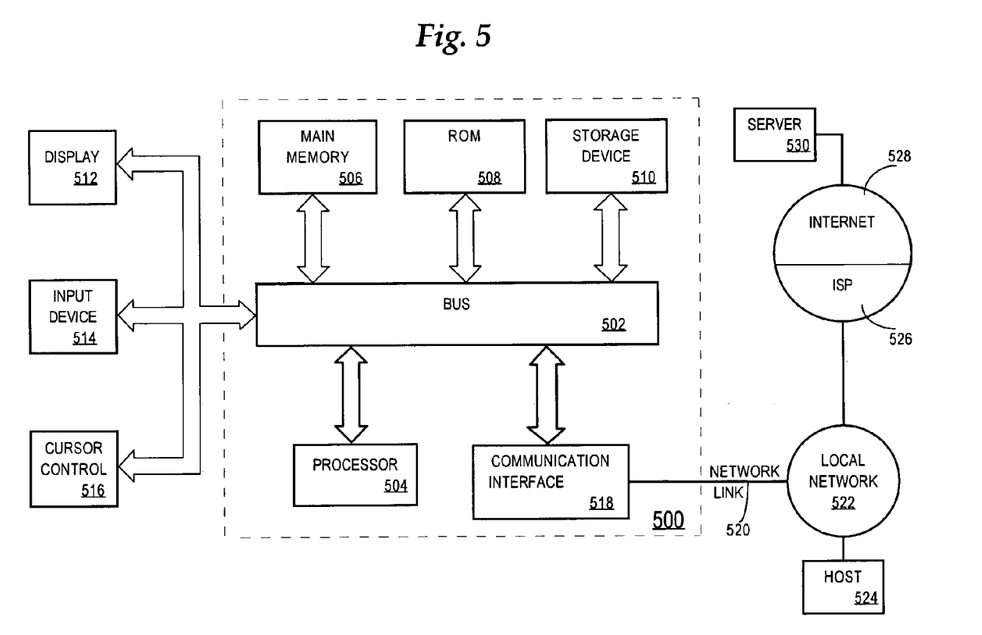
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing commands in a database system, the method comprising:
   receiving a request to execute a database command;
   within the database system, parsing the database command to generate parsed information;
   plugging an external module in to the database system;
   communicating the parsed information to the external module;
   prior to executing the database command, determining whether the parsed information satisfies one or more conditions; and
   if the parsed information satisfies the one or more conditions, then determining that no database command should be executed in response to the request to execute the database command;
   wherein the external module performs at least one of
      (a) the step of determining whether the parsed information satisfies one or more conditions, and
      (b) the step of determining that no database command should be executed in response to the request to execute the database command.

2. The method of claim 1, wherein the one or more conditions are based on information specified in the executable code of the database system.

3. A computer-readable storage medium storing one or more sequences of instructions which, when executed by one or more processors, causes the one or more processors to perform the method recited in claim 2.

4. The method of claim 1, further comprising:
   after determining that no database command should be executed in response to the request, determining an action to be performed when the one or more conditions are satisfied, and
   performing the action in response to the request.

5. The method of claim 4, wherein the step of performing the action includes terminating the database session that issued the request.

6. A computer-readable storage medium storing one or more sequences of instructions which, when executed by one or more processors, causes the one or more processors to perform the method recited in claim 5.

7. The method of claim 4, wherein the step of performing the action includes locking out the user that issued the request.

8. A computer-readable storage medium storing one or more sequences of instructions which, when executed by one or more processors, causes the one or more processors to perform the method recited in claim 7.

9. The method of claim 4, wherein the step of performing the action includes sending one or more dummy values in response to the request.

10. A computer-readable storage medium storing one or more sequences of instructions which, when executed by one or more processors, causes the one or more processors to perform the method recited in claim 9.

11. The method of claim 4, wherein the step of performing the action includes logging an alert that includes information about the request.

12. A computer-readable storage medium storing one or more sequences of instructions which, when executed by one or more processors, causes the one or more processors to perform the method recited in claim 11.

13. A computer-readable storage medium storing one or more sequences of instructions which, when executed by one or more processors, causes the one or more processors to perform the method recited in claim 4.

14. A computer-readable storage medium storing one or more sequences of instructions which, when executed by one or more processors, causes the one or more processors to perform the method recited in claim 1.

15. A method for processing commands in a database system, the method comprising:
    receiving a request to execute a database command;
    within the database system, parsing the database command to generate parsed information;
    plugging an external module in to the database system;
    communicating the parsed information to the external module;
    prior to executing the database command, performing the steps of:
        based on the parsed information, performing an evaluation of a set of rules; and
        determining, based on the evaluation, whether to perform an action other than executing the database command; and
    if the evaluation indicates that the action is to be performed, then performing the action without modifying the database command;
    wherein the external module performs at least one of
        (a) the step of performing the evaluation of the set of rules,
        (b) the step of determining, based on the evaluation, whether to perform the action other than executing the database command, and
        (c) the step of performing the action without modifying the database command.

16. The method of claim 15, wherein the step of performing the action includes performing the action in addition to executing the database command.

17. A computer-readable storage medium storing one or more sequences of instructions which, when executed by one or more processors, causes the one or more processors to perform the method recited in claim 16.

18. The method of claim 15, wherein the step of performing the action includes performing the action instead of executing the database command.

19. A computer-readable storage medium storing one or more sequences of instructions which, when executed by one or more processors, causes the one or more processors to perform the method recited in claim 18.

20. The method of claim 15, wherein the set of rules is based on information specified in the executable code of the database system.

21. A computer-readable storage medium storing one or more sequences of instructions which, when executed by one or more processors, causes the one or more processors to perform the method recited in claim 20.

22. The method of claim 15, further comprising the step of creating the set of rules based on information received from a user of the database system.

23. A computer-readable storage medium storing one or more sequences of instructions which, when executed by one or more processors, causes the one or more processors to perform the method recited in claim 22.

24. The method of claim 15, wherein the step of determining, based on the evaluation, whether to perform an action other than executing the database command includes determining the action based on information received from a user.

25. A computer-readable storage medium storing one or more sequences of instructions which, when executed by one or more processors, causes the one or more processors to perform the method recited in claim 24.

26. The method of claim 15, wherein:
    the action is associated with a particular rule of the set of rules; and
    the step of performing an evaluation of the set of rules includes determining that conditions associated with the particular rule have been satisfied.

27. A computer-readable storage medium storing one or more sequences of instructions which, when executed by one or more processors, causes the one or more processors to perform the method recited in claim 26.

28. The method of claim 15, wherein the step of performing the action includes terminating the database session that issued the request.

29. A computer-readable storage medium storing one or more sequences of instructions which, when executed by one or more processors, causes the one or more processors to perform the method recited in claim 28.

30. The method of claim 15, wherein the step of performing the action includes locking out the user that issued the request.

31. A computer-readable storage medium storing one or more sequences of instructions which, when executed by one or more processors, causes the one or more processors to perform the method recited in claim 30.

32. The method of claim 15, wherein the step of performing the action includes sending one or more dummy values in response to the request.

33. A computer-readable storage medium storing one or more sequences of instructions which, when executed by one or more processors, causes the one or more processors to perform the method recited in claim 32.

34. The method of claim 15, wherein the step of performing the action includes logging an alert that includes information about the request.

35. A computer-readable storage medium storing one or more sequences of instructions which, when executed by one or more processors, causes the one or more processors to perform the method recited in claim 34.

36. The method of claim 15, wherein the step of performing the action includes auditing a database connection over which the request to execute the database command is issued.

37. A computer-readable storage medium storing one or more sequences of instructions which, when executed by one or more processors, causes the one or more processors to perform the method recited in claim 36.

38. The method of claim 15, wherein the step of performing the action includes auditing a database session that issued the request to execute the database command, wherein the database session comprises one or more database connections.

39. A computer-readable storage medium storing one or more sequences of instructions which, when executed by one or more processors, causes the one or more processors to perform the method recited in claim 38.

40. The method of claim 15, wherein the step of performing the action includes logging information about one or more database system parameters, wherein the one or more database system parameters are determined based at least in part on the parsed information.

41. A computer-readable storage medium storing one or more sequences of instructions which, when executed by one or more processors, causes the one or more processors to perform the method recited in claim 40.

42. A computer-readable storage medium storing one or more sequences of instructions which, when executed by one or more processors, causes the one or more processors to perform the method recited in claim 15.

* * * * *

UNITED STATES PATENT AND TRADEMARK OFFICE
CERTIFICATE OF CORRECTION

PATENT NO. : 7,356,545 B2
APPLICATION NO. : 11/023112
DATED : April 8, 2008
INVENTOR(S) : Muralidharan et al.

It is certified that error appears in the above-identified patent and that said Letters Patent is hereby corrected as shown below:

In column 3, line 17, delete "and" and insert -- an --, therefor.

Signed and Sealed this

Tenth Day of November, 2009

David J. Kappos
*Director of the United States Patent and Trademark Office*